United States Patent [19]

Kafri et al.

[11] Patent Number: 5,313,564
[45] Date of Patent: May 17, 1994

[54] GRAPHIC MATTER AND PROCESS AND APPARATUS FOR PRODUCING, TRANSMITTING AND READING THE SAME

[75] Inventors: Oded Kafri, Beer-Sheva; Marco Luzzatto; Kfir Luzzatto, both of Omer, all of Israel

[73] Assignee: Fontech Ltd., Beer-Sheva, Israel

[21] Appl. No.: 727,962

[22] Filed: Jul. 10, 1991

[30] Foreign Application Priority Data

Oct. 25, 1990 [IL] Israel .................................. 96118
Jan. 16, 1991 [IL] Israel .................................. 96969
Jan. 16, 1991 [IL] Israel .................................. 96973

[51] Int. Cl.⁵ ............................................ G06F 15/00
[52] U.S. Cl. ...................................... 395/101; 380/51
[58] Field of Search ................ 395/110, 114, 101; 380/51, 55, 18, 20, 6, 7; 283/72, 94, 98, 17

[56] References Cited

U.S. PATENT DOCUMENTS 2,952,080  9/1960  Avakian .
3,914,877 10/1975  Hines .................................. 283/17
4,776,013 10/1988  Kafri et al. .
4,896,355  1/1990  Iggulden et al. .
4,912,761  3/1990  Tan .

*Primary Examiner*—Arthur G. Evans
*Attorney, Agent, or Firm*—Merchant & Gould, Smith, Edell, Welter & Schmidt

[57] ABSTRACT

An apparatus for composing a printable text, comprising coded characters, comprises: A—a text-composing device; B—a memory for storing character grids, representing clear characters, arranged in at least a coded font wherein the character grids are derived from a common, scrambled reference grid; and C—means associated with said text-composing device for selecting clear characters or character grids, as desired. A process for composing a printable text, comprising coded characters and graphic matter obtained thereby, are also described.

9 Claims, 8 Drawing Sheets

THE CURRENT FOREIGN MINISTER OF ISRAEL IS :
ANSWER :   LEVY
FIG. 1
FIG. 5
THE CURRENT FOREIGN MINISTER OF ISRAEL IS :
ANSWER :   
FIG. 6
THE CURRENT FOREIGN MINISTER OF ISRAEL IS :
ANSWER :   
FIG. 7

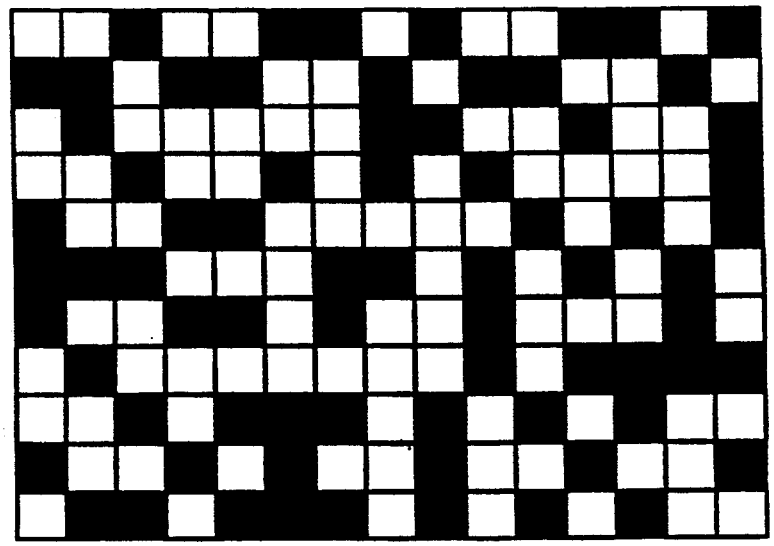
FIG. 4
JOSTH937:5-1
FIG. 16
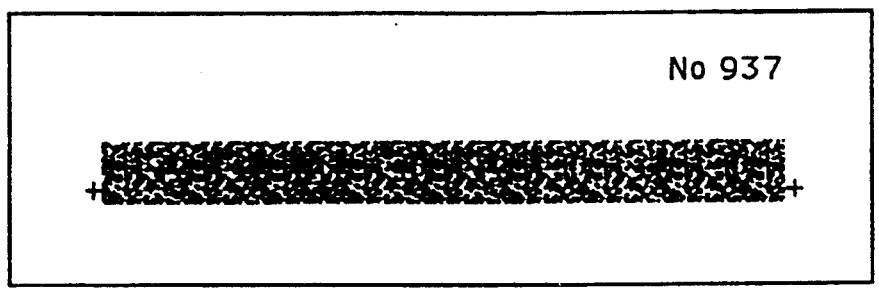
FIG. 17

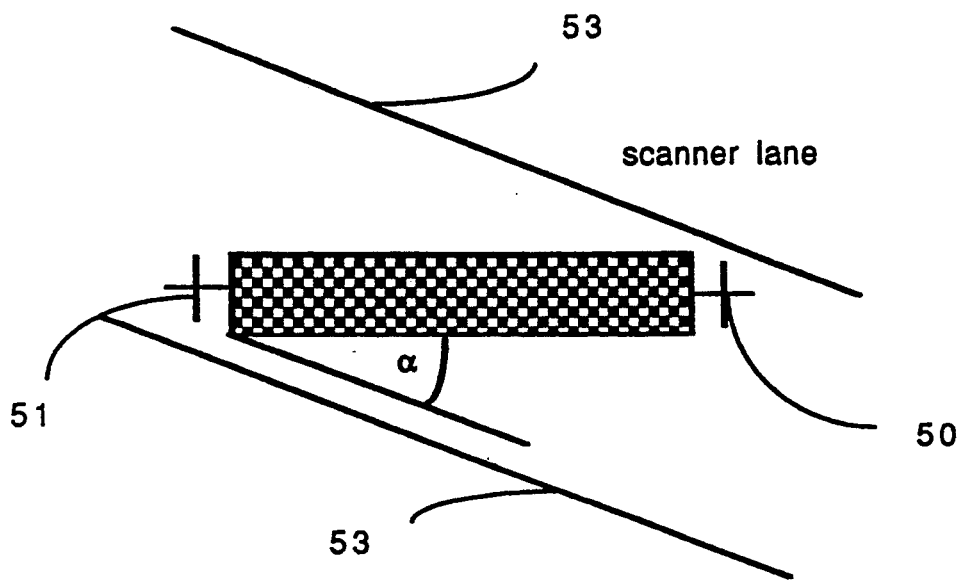
FIG. 13
1001110010100110100111001000011101100 1010
FIG. 14A
1001111101011001100111001000011101100 1010
FIG. 14B
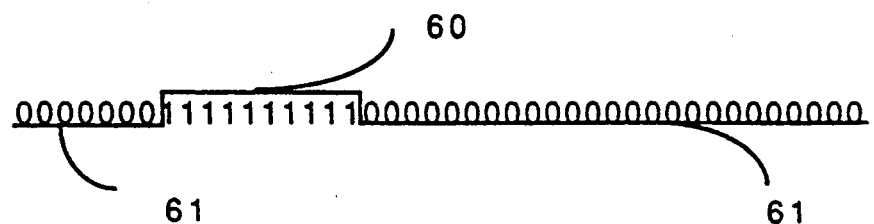
FIG. 14C

JOSEPH SMITH & CO.

POSTAL ADDRESS :
P.O.BOX 8381
RAMAT-ODED 83 912
ISRAEL

VAT NO : 5988451

TO :

DEBIT NOTE NO. : 937

DATE :

RE : OUR REF. : 9999

AMOUNT

| TO PROFESSIONAL SERVICES : | |
|---|---|
| VAT | |
| TOTAL DUE : | |

FIG. 15

GRAPHIC MATTER AND PROCESS AND APPARATUS FOR PRODUCING, TRANSMITTING AND READING THE SAME

FIELD OF THE INVENTION

This invention relates to graphic matter and process and apparatus for making and transmitting the same. More particularly, it relates to graphic, especially printed matter that should not be readable at any time by mere inspection, but only at predetermined times and/or particularly by predetermined persons, to process and apparatus for making such graphic matter, for transmitting it and for allowing such predetermined persons to read it. Examples of such matter are texts containing information that should not be understood without a certain effort, such as certain educational material, texts containing information that it is desired to protect from casual prying, and texts containing the authentication of a document which carries them.

BACKGROUND OF THE INVENTION

Printed educational material often contains questions, the answers to which must be provided by the reader and checked against a set of answers. Thus, in exercise books relating to natural sciences or other subjects, problems are set forth in a part of the book, and the solutions to the problems are set forth in a different part of the book, e.g. an appendix, to which the reader must continuously refer. In more complex cases, a text may be provided in which some words or figures are missing and the missing words or figures are supplied in a different part of the book. The necessity of constantly referring to a different part of the exercise book creates inconvenience and fatigue, is the source of not uncommon mistakes, such as when the reference numerals or other indications which correlate the questions to the corresponding answers are not accurate, and greatly limits the possibility of inserting within the printed text indications that must be supplied by the reader and may present increasing degrees of difficulty, in order gradually to advance the learner's knowledge. It would be highly desirable to provide printed matter which includes elements which cannot be read unless the reader wishes it, e.g. answers to questions or data which must be supplied by the reader.

In general, graphic matter, in particular printed texts, often contains information, which it is desired to keep private and protect from casual prying. For instance, information as to the balance of bank accounts is often exposed to the eyes of strangers and is readable at a glance; or certain confidential data may be contained in office documents which pass through the hands of employees who may not be completely trusted not to divulge them. Such texts therefore cannot be transmitted by such widely used means as telecopier apparatus. It would be desirable to permit creation and transmission of such matter in such a way as to assure that it cannot be read and understood by unauthorized persons who may see it or gain access to it.

Identifying graphic matter, such as words or numbers, is often included in documents to identify their origin, their destination etc. Such identifying graphic matter, however, can easily be reproduced or counterfeited and is often unreliable. It would be desirable to find a way to prevent such reproduction and counterfeiting.

Authentication of documents is desirable in a number of other instances. For example, diplomas or certificates of various kinds may be counterfeited and the agency, such as a public office or an institute, that is purported to have issued them, may find it difficult to check their authenticity as many years are supposed to have passed since they have been issued. Again, public offices may not have the time and/or the personnel for checking the authenticity of documents submitted to them in support of an application for a registration, a compensation, and so on. Further, tickets which are supposed to be issued to specified persons for admission to performances or games or the like, may be lost or stolen or counterfeited, and this is true of cards required to obtain admission to restricted premises, such as offices or laboratories engaged in confidential work; and the problem exists in checking whether the ticket or card has truly been issued to the person presenting it. As far as it is known to the applicant, no satisfactory solution to the aforesaid problems has been offered so far in the art. Also, in the case of fiscally relevant documents, such as bills, which purport to have been issued by a person or company to another person or company, with respect to the merchandise supplied or services rendered, it would be highly desirable to provide means for permitting the competent authority easily to determine whether any particular bill is truthful, viz. has been issued by the person or company purporting to have issued it, and is regular in all respects, whereby to prevent the counterfeiting of such bills or the preparation of bills that do not originate with recognized suppliers of bills or services or are irregular in other respects.

The prior art has dealt with these problems, or at least with part of them, essentially in three ways: by encoding, by scrambling and by encryption. Encoding is a complex procedure that cannot be used in everyday office or administrative work and which requires special training. Furthermore codes are easily broken unless they are so complex as to be usable only in very special circumstances. Scrambling is usually carried out in real time, viz. a message must be scrambled, transmitted and unscrambled concurrently. If it is not, there is time to unscramble the scrambled message by well known methods, based e.g. on the frequency of the letters of the alphabet in the languages. Furthermore, an apparatus which permits to read a scrambled message, also permits to scramble a clear message, whereas it would be highly desirable, and it is a purpose of this invention, as will appear hereinafter, to provide graphic matter that may be read by persons that are not authorized nor capable of producing it.

Encryption methods are known which are based on the transformation of an original image into a coded image by means of a key grid and visualization of the original image from the coded image by optical means are disclosed e.g. in U.S. Pat. Nos. 3,914,877. Such encryption methods however are more or less complex and lengthy and they cannot be carried out in the course of ordinary printing processes. They are therefore not applicable to the production of documents or to their transmission.

Cryptographic systems, based on public key cryptosystems, are described e.g. in the article by P. G. Comba "Exponentiation cryptosystems on the IBM PC", in IBM Systems Journal, vol. 29, No. 4 (1990), 526-538. While they may afford a high degree of secrecy, they are too complex to be currently used by unspecialized personnel in normal office procedure and for widespread use. Further, they—like other systems—are highly sensitive to noise.

It is a purpose of this invention to provide graphic matter, in particular printed texts, that cannot be read and understood except by authorized persons.

It is another purpose to provide such matter in an easy and economical way, as a part of conventional printing operations.

It is a further purpose to provide such matter which may be transmitted by means of conventional apparatus, in particular by telecopier.

It is a still further purpose to provide such matter which permits authentication of documents carrying it and of photostatic or other copies of an original document.

It is a still further purpose to provide an apparatus and a process for producing and visualizing and/or reading such graphic matter.

It is a still further purpose to provide such apparatus and process that permit the transmission of such graphic matter in a form that cannot be visualized and/or read by unauthorized persons and subsequently visualizing and/or reading the same.

It is a still further purpose to provide apparatus and process for authenticating, by means of such graphic matter, documents, such as fiscally relevant documents, e.g. bills, receipts and the like, or documents bearing the seal of a company or a public authority or the like, or tickets or admission cards.

Other purposes of the invention will become apparent as the description proceeds.

SUMMARY OF THE INVENTION

The invention comprises a process for composing a printable text, comprising coded characters, by;
1. defining, at least ideally, at least one blank grid;
2. creating a reference grid consisting of a scrambled distribution, as hereinafter defined, of at least two digitizable values in the cells of the blank grid;
3. creating at least one coded font by:
   a. individually superimposing, at least ideally, each character to be comprised in the font to at least a portion of the reference grid; and
   b. changing the digital values of the reference grid in the cells thereof comprises in the area covered by the superimposed character, whereby to create a scrambled character grid which represents the character;
4. storing in a memory commands for alternatively selecting characters or character grids, as desired; and
5. defining by means of a text composing device the desired text, wherein any characters not comprised in a coded font—hereinafter "clear characters"—are represented in a conventional way and any characters comprised in a coded font—hereinafter "coded characters"—are represented by the corresponding character grids, whereby to compose the text.

The invention further comprises a process for producing a printed text, comprising coded characters, which comprises composing a text by the aforesaid process, wherein the character grids are stored in the memory of a print-controlling device, and printing the composed text by graphically defining: a) any clear characters in the conventional way, b) any coded characters by signs representing the digital values of the respective character grids.

The invention further comprises a process for producing and reading a printed text comprising coded characters, which comprises producing the text by the process hereinbefore set forth, and subsequently identifying the cells of the character grids in which the digital values are different from those of the reference grid, and visualizing each of said character grids in decoded form as a grid, hereinafter called the "clear grid", having the same dimensions (e.g., number, size and distribution of cells) as the character, reference and blank grids, wherein said cells having different digital values are differentiated from the remaining cells of the character grids, hereinafter also called "the background", whereby said differentiated cells form the clear characters corresponding to the coded character grids.

In order to identify the cells of the character grids in which the digital values are different from those of the reference grid and to create the clear grids:

in a form of the invention, 8a. a copy of the reference grid is provided on a transparent sheet, and 9a. correspondence marks are provided on the printed and optionally impaginated text and on said transparent copy, whereby when said transparent copy is superimposed to the printed text, so that a reference grid is superimposed to each character grid which is to be read, the coded characters become detectable in clear form and identifiable; and in another form of the invention, 8b. at least the coded part or parts of the printed text are scanned; and 9b. the digital value of each cell of each scanned character grids, as detected as black or white in the scanning, is compared to the value of the corresponding cell of the reference grid and the clear grid is created by applying the XOR-rule, as hereinafter defined, to the results of said comparison.

The invention further comprises an apparatus for composing a printable text, comprising coded characters, which comprises:

A. a text-composing device;

B. a memory for storing character grids representing clear characters, arranged in at least a coded font wherein the character grids are derived from a common, scrambled reference grid; and C. means associated with said text-composing device for selecting clear characters or character grids, as desired.

The invention further comprises and apparatus for producing coded fonts, to be stored in a memory according to claim 1, including:

D. a random generator;

E. means for causing said generator to generate any desired one among a number of predetermined random or quasi-random grids to provide a reference grid; and F. means for comparing each clear character to be comprised in the font to a selected reference grid and changing the digital values of said latter only in the areas covered by the clear character, whereby to create a coded font for each selected reference grid; which apparatus may optionally be structurally combined with the text-composing apparatus hereinbefore defined.

The invention further comprises an apparatus for printing a text, comprising coded characters, which comprises an apparatus for composing a text, as hereinbefore defined, and:

G. a print-controlling device; and

H. a printer;

wherein the aforesaid memory is associated with said print-controlling device, and this latter may be identified with the text-composing device or with the printer or may be a separate device, such as an interface.

The invention further comprises an apparatus for reading a text, comprising coded characters, which comprises:

K. means for comparing the printed character grids with any selected one of the reference grids from which the coded fonts stored in the aforesaid memory are derived, whereby to identify the corresponding clear characters; and I. means for visualizing said clear characters.

In one form of the invention, the means for comparing the printed character grids with the reference grid comprise transparent sheets having printed thereon the reference grid and correspondence marks on the printed text and on the transparent sheet. By "correspondence marks" is meant herein any means that permit exactly to superimpose said transparent sheet to said text, including printed signs and mechanical means, such as bores and pins. Aligning devices may be used in place of correspondence marks and are to be considered equivalent to them.

In another form of the invention, the means for comparing the printed character grids with the reference grid comprise means for recognizing images and transmitting them to a computer memory, such as a CCD camera or a scanner, means for transmitting to a digital comparator, which may be a computer, the optical information obtained through said image transmitting means, memory means for storing in said comparator the reference grids or, preferably, a random generator, means for selecting a stored reference grid or the reference grid to be generated by said random generator, and means for comparing said transmitted information with the selected reference grid.

The novel printed graphic matter obtained by said process and apparatus, and comprising clear characters and coded characters which are a XOR-representation (as hereinafter defined) of clear characters, is also a part of the invention.

By "XOR-rule", applied to the comparison of digital values, in meant herein the rule according to which the result of the comparison is 0 (or white) if the two compared values are equal (both 0 or both 1) and is 1 (or black) if they are different (one is 0 and the other is 1). This comparison can be affected, as is well known, by means of a XOR-gate or by software. By "XOR-representation" of a character is meant herein a character grid to the cells of which are attributed the digital values that result from the application of the XOR-rule to the comparison of the clear character and the reference grid.

DESCRIPTION OF THE DRAWINGS

The invention will be better understood from the description of embodiments thereof, with reference to the appended drawings, wherein:

FIG. 1 shows a sentence from a printed page, including a question and answer, printed entirely in plain characters;

FIG. 4 shows a character grid representing the said letter H, at a greatly enlarged scale;

FIG. 5 represents a strip of a transparent material with the space in which the reference grid is to be printed and the reference marks printed thereon;

FIG. 6 represents the portion of the page of FIG. 1, wherein the answer to the question of FIG. 1 is represented by a character grid, and wherein the correspondence marks are also printed;

FIG. 7 shows how the superimposition of the transparent strip of FIG. 5 to portion of printed page of FIG. 4 permits to read the answer to the question;

FIGS. 11, 12 and 13 schematically illustrate the manner in which vertical deformations, changes of scale, or differences of orientation between scanner and print can be compensated;

FIGS. 14a, 14b and 14c illustrate the use of linear grids;

FIG. 15 shows the letterhead of a bill to which another embodiment of the invention is to be applied;

FIG. 16 shows the identifying data to be marked on a sticker attached to the bill, according to said embodiment; and FIG. 17 shows a sticker bearing the data of FIG. 2 in coded form.

DETAILED DESCRIPTION OF PREFERRED EMBODIMENTS

Figure 2:
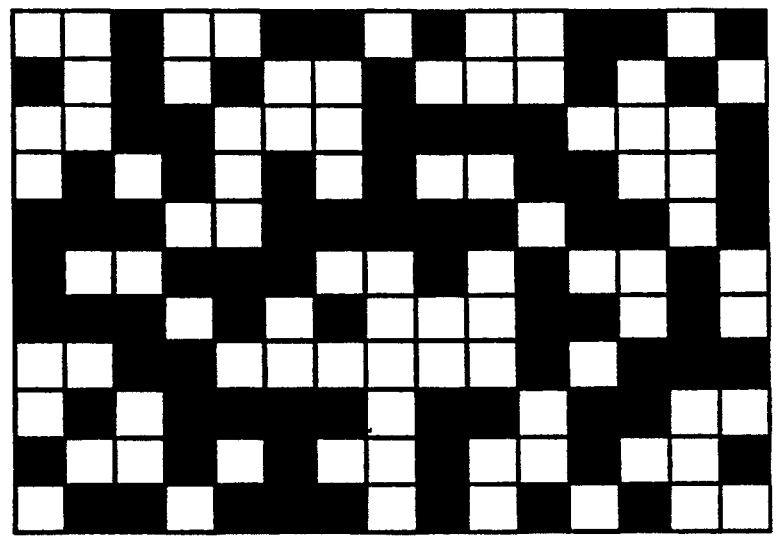
FIG. 2 represents a reference grid, at a greatly enlarged scale.

The blank grid consists of a number of cells to which no specific digital values are assigned or arbitrary values having no significance—e.g. all zeros—are assigned. It defines the dimensions of the reference and character grids. It is usually defined by intersecting grid lines, the nature and spacing whereof may vary according to the specific application that is made in each individual case. Preferably a Cartesian grid is used, wherein each grid line may have either one of two orientations, the two orientations being perpendicular to one another, and the spacing of successive parallel grid lines, or "grid pitch" being constant. In the embodiment in which the clear grids are defined by superimposition of the reference grid to the character grids the grid pitch is preferably not smaller than one-tenth of a millimeter, as this will facilitate the exact superimposition, though it will render the coded characters less sharp.

The blank grid may be graphically defined on a screen or may only be ideally defined by its pitch or pitches or by the number of its cells in the unit area or by a subroutine or other program stored in the memory of a word processor or printer or other print-controlling device. It should be considered as "defined" whenever it is possible to assign to any given cell thereof a digitizable value, though no such value is as yet assigned.

By "digitizable values" is meant characteristics which can be represented by digital values. They may actually be digital values or, e.g., graphic symbols, or black and white or additionally degrees of gray, to which the digital values may correspond, or again, different colors which may conventionally be represented by digital values. Preferably, only two digital values are used, since this is more desirable for the purposes of the invention, and they may be equivalently represented in digital form by the values 0 and 1 or black and white. If two digital values are used, the reference grid will consist of a distribution of 0s and 1s, or blacks and whites, in a random manner in the cells of the blank grid.

By "scrambled grid" is meant a grid which is sufficiently randomized to make the coded characters illegible without using the reference grid, including truly or approximately random grids. Routines are known for building what is called a "random grid", though in practice it is not exactly, but only "quasi-", viz. approximately, random. If it is desired to use a scrambled grid which contains less accumulations of "clots" of black (or 1) cells the routine is modified to: a) retain the white cell values which it defines; b) for each black value, check whether the following cell is white or black; c) if said following cell is white, retain the black value; d) if it is black, verify whether the preceding cell was white or black, and if it was white, retain the ensuing black value, but if it was black, reject it and determine a new value. Thus, the probability of having two adjacent black cells in the grid will be halved, and can be further reduced by repeating the same procedure, though care should be taken not to render the white cells become so predominant that the coded characters will become decipherable. On the other hand, it is to be understood that the use of a truly, or better, practically, random grid, as created by conventional random generation, is comprised in this invention, and therefore the expression "scrambled grid" is to be construed as including such random grids.

By "characters" is meant letters, numerals, punctuation marks, mathematical or any other symbols, and in general, any graphic signs. Characters in general will be considered to be "clear" when they represent themselves, viz. have an aspect that is recognizable by the typical reader as containing the information that the character is ordinarily intended to convey; while they will be considered as "coded" when they do not have such an aspect, viz. represent something that is not ordinarily associated with their aspect and the information that they are intended to convey is not immediately recognizable by mere direct inspection.

By "superimposing, at least ideally, the character to at least a portion of the reference grid" is meant establishing a correspondence between the points of the character and the cells of the reference grid. This can be done in many ways. One may draw or represent on a screen, e.g., a computer screen, the reference grid, and actually draw the character over the reference grid. Alternatively, one might draw a blank grid which is a replica of that originally used and draw the character on the replica blank grid, and then establish a correspondence between the cells occupied by the character in said blank grid and the corresponding cells of the reference grid. In order to do this, one need not actually draw the character over the replica blank grid, but can draw or show on a screen said blank grid and then fill the cells thereof with appropriate symbols so as to create the outline of the character. The word "draw" should be construed as including any operation which defines the "drawn" character or outline or area, comprising the creation and/or use of a defining subroutine or other program.

Changing the digital values in the cells in the area covered by the superimposed character can be effected in any desired way. Of course, once again, the said area may be defined only ideally and not actually in a graphic manner, or, in other words, it may be "drawn" in the broad sense defined hereinbefore. Since the digital values of the reference grid are preferably only two, the change which is carried out in the cells comprised in the superimposed character will preferably be an inversion of the digital value, viz. a change from 0 to 1 or from black to white, or vice versa. The two operations $3a$ and $3b$ of the process defined hereinbefore can be combined by showing on a screen or generally "drawing" the reference grid and inverting the digital values of the cells which are designated as being comprised in the area occupied by the character. The cells in which the inversion is carried out may be graphically indicated in any suitable way, e.g. by a mark, so as to be apparent to the operator's eye, who thus defines, concurrently within the inversion, the area comprised in the outline of the character, where the inversion is to be effected.

By "a print-controlling device" is meant any device which determines what will be printed and thus, generally, it may be the text-composing device (indicated as A in the above definition of the invention), such as a word processor—to which non-limitative reference will be made hereinafter in describing the embodiments of the invention—or printer (H), but possibly it may be another device that may be provided for this specific purpose. The commands which determine how the printing is carried out may be stored e.g. in a word processor memory or in a printer memory. The word processor may compose an entire page or an entire text and transmit it to the printer, which will store it, or it may compose single words or even single characters and transmit them immediately to the printer, which will store them in its memory. The word processor and the printer may be of any kind known in the art, and, for instance, they may be respectively a mini- or microcomputer and a laser or ink-jet or bubble-jet or other kind of printer, or they may be Linotypes or other apparatus used for book-printing or the like. The character grids, therefore, may be stored in the memory of the word processor or of the printer, as the conventional fonts may be stored in the memory of conventional word processors and printers or other devices.

All the character grids deriving from a given reference grid will constitute a "coded font". A printer—whatever its type—may store a number of coded fonts. In this case, the text composing device will communicate to the printer the font with which it should print and the several characters, identified as plain characters, e.g. by their ASCII symbols. The input to the printer will thus be the same as if the plain characters were printed, except for the single, initial command, to print a given coded font. Alternatively, the printer may receive from the text composing device severally the individual coded character in the same way in which it would receive a purely graphic input, viz. the text composing device will input to the printer the coded characters in graphic language, and the printer will be able to understand such graphic language by means well known in the art, e.g. as POSTSCRIPT language.

The word processor will compose the desired text by means of characters. Most of the text, more precisely the parts thereof which are to be printed plainly in the usual way, and not by means of a font created according to the invention, may be represented in any known and conventional manner, and in many cases by ASCII symbols, while the characters comprised in the coded fonts will be represented by the corresponding character grids. In order thus to define the text, the word processor must register a command which indicates how each character is to be represented. In practice it will be sufficient to indicate what parts of the text are to be printed in a coded font. This can be done either by attributing to each coded character a symbol of its own, as is often done with conventional fonts, or by indicating by means of an appropriate symbol the point at which the coded text begins, and the point at which the coded text ends. Such commands will be stored in the memory of the device which composes the text, generally the word processor, but they will be executed either by the word processor or by the printer or by any device controlling the printing operation, depending on which device stores the coded fonts.

By "visualizing" a text or text portion, is meant herein rendering its content visible in any way, e.g., by showing it on a screen or display of any kind, or printing it, or both. A text need not be visualized in the same graphic form in which it was composed: it suffices that its contents be visible in such a way that they may convey their intended meaning. For example, a text may have been composed in a certain clear font, with parts of it in a coded font, and the coded parts may be decoded and the clear words thus reconstructed may be shown on display in a clear font that is altogether different from the font in which the text has been composed, and may also be different from the font in which it is intended to be printed and will be printed. Nevertheless, the display constitutes a "visualization" of the text, and as such is equivalent, from the viewpoint of this application, to any other visualization, such as a print or a display of the same text in a different font. It will be appreciated that such differences will usually exist, e.g., when the display is of the "English flag" type, while the text may be intended to be printed in any desired font made available by a word processor and printable, e.g., by a laser or other printer. The word "text" as used herein, includes matter which consists of or comprises matter other than words, such as, e.g., numbers, graphic signs, mathematical or other symbols, and the like. In some cases, and particularly in the authentication of documents, "visualizing the text" should be construed as displaying not the clear text itself, but some other text which bears a certain relation to it and which expresses the result of a test, e.g. that a certain document bearing the text has been recognized as authentic or a certain operation as authorized, or the opposite, as will become clear hereinafter.

Once a text has been composed, the coded characters are printed by attributing the appropriate color values to the various cells of the character grids. In the most common way of carrying out the invention, where the digitizable values are only two and can be represented by 0 and 1, the cells to which the 1 value is associated will be printed in black or black pixels will be printed therein, and the cells in which the 0 value is marked will receive no mark and remain void, viz. white. Alternatively, suitable color combinations could be used; and again, more than two digital values, requiring more than two colors or shades of color, may be required.

In a preferred form of the invention, the coded part or parts of the text are visualized in decoded form by printing them in such form. In another preferred form, they are visualized on a screen or on a display, such as a liquid crystal display.

In a further preferred form of the invention, the printed text, comprising the coded part or parts, is transmitted by telecopier (fax) and the transmitted code part or parts thereof are scanned, decoded and visualized.

In a still further preferred form of the invention, the reference grid, relative to a given printed text comprising a coded part or parts, is stored in the memory of a scanner or of a computer means to which the scanner is operatively connected or of another device for comparing scanned character grid data with reference grid data, and preferably a number of such reference grids is stored and a signal, e.g., a code, is fed to the device in which the grids are stored for selecting the particular one relative to the particular coded text that is to be decoded at the moment. Alternatively, the reference grid corresponding to the character grids to be scanned is constructed prior to or concurrently with the scanning operation by means for constructing random or scrambled grids, such as a suitable microcircuit or computer program, and a signal, e.g., a code, is fed to the device in which the grids are stored for selecting the particular grid that is required for decoding a particular coded text.

In a still further preferred form of the invention, the coded text includes or is accompanied by spacing signs defining the lateral spacing of a given number of character grid cells, e.g., those comprised in a coded segment of the text between uncoded portions thereof, this is compared with the spacing of the same number of cells of the reference grid or of the blank grid and the spacing ratio so determined is utilized to compensate for any change in scale introduced or uncontrolledly or randomly occurred between the definition of the character grid and its submission to the scanning operation. Optionally, said spacing signs often define the vertical positions of the lines or line segments comprising character grids. Optionally, also, the coded text includes a sign of any kind or other indication, such as a code, defining the height of the character grids. Optionally, further, the text includes signs, which are conveniently the aforesaid spacing signs, which serve to determine the orientation of the character grids, in order to compensate for any deviations of the directions of scanning with respect to the direction of the grid axes.

In a still further form of the invention, each character grid comprises at least two, and optionally more sections, that are created on the basis of different reference grids, a signal is sent to the device storing or creating the reference grids for selecting the reference grid relative to the first section, and this latter contains a code, to be read by the scanner, defining the reference grid relative to the second section (and so on, if the sections are more than two).

In a still further form of the invention, which is particularly useful for certain applications, the reference grids are unidimensional or linear, viz. are constituted each by a single row of digital values, usually 0 (white) and 1 (black), and each character grid, which is likewise linear, is defined by inverting the digital values in one or more segments (hereinafter called the "code segments") of said row of values. The number, length and distribution of the code segments constitute the character code, viz. define the character thus represented. The character codes are conventional and in general will not be related to the geometric form of the character. The scanned character grids are compared with the corresponding reference grids, stored or created as hereinbefore explained, the character code is thereby recognized, and the corresponding clear character is visualized in any convenient way, by building a clear grid having suitable dimensions, or in any other way by which a character defined by a symbol or a code can be visualized, e.g., in the same way in which characters are visualized once they are defined by ASCII symbols.

In a variant of the last mentioned form of the invention, the digital values, in the rows which constitute the reference and character grids, can be represented by means other than optical means, e.g. by magnetic dots instead of color pixels. The scanning, in such a case, will not be optical, but will be adapted to the physical nature of the digital-value-defining means employed. Scanning magnetic cards, e.g., is conventional in the art.

Such a variant can be applied in general to all the embodiments of the invention, viz. the digital values can be defined by any suitable physical means and corresponding scanning devices can be employed. The resulting adaptations in the ways of carrying out the invention will be obvious to persons skilled in the art. Correspondingly, the word "scanning" should be construed, unless otherwise stated, and particularly in the definition of the invention and in the claims, as broadly including optical, magnetic scanning, and in general the scanning of any physical entities capable of defining digital values; the word "scanner" should be construed as including any device for transmitting images, optically, magnetically or otherwise defined, to a computer memory; and the word "printing" should be construed as forming a grid—in matrix or linear form—of color or magnetic dots or of any other physical entities capable of defining digital values. Entities of any nature which can be interpreted as representing digital values will be generally designated as "digitizable values"; and this expression should be so construed in the claims.

In constructing the blank and the reference grids, the degree of resolution possessed by the printer to be used is taken into account. A laser printer, connected e.g. with a mini- or microcomputer used as a word processor, may print as many as 90,000 cells per square inch; and if the printer is a Linotype, the resolution is much higher. A random grid may be created by random generators well known in the art. The random generator will create the reference grid by introducing in all the cells of the blank grid a digital value chosen in a more or less randomized way, generally either white (0) or black (1). However, the resolutions mentioned above are usually excessive. Therefore, each cell will include a number of dots, which will receive the same digital value, e.g. be all white or black: in the case of a laser printer, each cell of the blank grid may include about 144 dots or more. Correspondingly, the printer, when printing on a transparent sheet the reference grid, will insert black dots in all the areas of the cells where the digital value is 1, and will not print anything in the areas of the cells where the digital value is 0. It will be possible to use shades of gray instead of black by inserting black dots only in a greater or smaller part of said cell areas. Therefore, the word black should be construed, wherever appropriate, as possibly including gray.

All this of course will not occur if the printer is of a type, such as the Dotmatrix type, which has a much less fine resolution.

The shape of the dots printed may depend on the type of printer. Some printers, in particular Linotypes, will print a black square which covers the entire space available for the dot, and this is very convenient for carrying out this invention. In other cases, e.g. in the case of some laser printers, the printer will print in each dot, which is in the area of the 1 value, a black mark that does not cover the entire dot and may have different shapes, for instance a diamond shape. At any rate a reference grid will be formed, which is schematically illustrated by way of example in FIG. 2. However, since the cells of the grid are extremely small, for clarity's sake the grid has been greatly enlarged in FIG. 2, and only a portion of it is shown.

The subsequent operation, that of creating the font, can be carried out in various ways. It will be understood that for each reference grid at least a font may be created and as many fonts can be created or stored in the memory of a word processor or a printer or in general a print-controlling device as are the possible reference grids.

Figure 3:
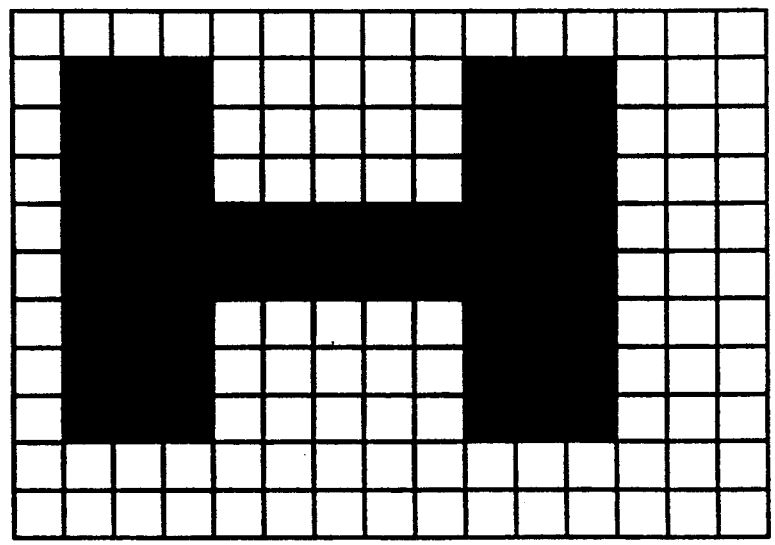
FIG. 3 shows how the character H is defined on the blank grid, shown at a greatly enlarged scale.

A portion of the blank grid sufficient to accommodate the desired character is shown on the screen of the word processor. It is shown at the largest possible scale, compatibly with the size of the screen, in order to facilitate the following operations. If the grid cells will generally be too small, even when enlarged, for the operator to carry out the operations that will be described, the grid will preferably be shown on the screen with cells each of which comprises a number of the true cells of the grid, say, four or more. The cells which define the area of the desired character will now be marked on the screen in any appropriate way. In FIG. 3 it is assumed that said cells have been completely blackened, so that the letter H appears in its normal shape, but they could be marked in any other visible way, say by entering an 'x' mark in each cell or in squares or rectangles representing each a cell or a number of cells, until the desired character appears in recognizable manner on the screen. The word processor will memorize the result of said operation and associate it with the character, in this case the letter H. The word processor will now compare each area comprised in the definition of the character with the corresponding area of the reference grid, and invert the digital values associated with each cells of said grid area, viz., in the case of binary digital values, will change 0 to 1 and 1 to 0. The skilled person will encounter no difficulty in providing the required software. The resulting grid is the character grid, illustrated, still at a greatly enlarged scale, in FIG. 4, which will of course be scrambled or even random, as the reference grid was scrambled or even random. For each character and each reference grid, at least a character grid is provided, so that if different reference grids have been prepared and stored in the memory of the word processor, an equal number of fonts may be prepared.

It is however highly desirable that the printing operator should not be required to go through the time consuming procedure described. It is therefore preferable to provide to him a coding program, in the form of a disc or in other suitable form, which contains all the necessary data which can be transferred to the word processor memory, e.g. to a hard disk, or to another memory of a print controlling device or a printer. Each reference grid can be considered as a "key" which transforms clear characters into coded characters. The word processor or other device used will have a number of clear fonts in its memory, identified, e.g. by ASCII or other symbols, and other clear fonts may be created or introduced by the operator. The coding program has stored therein a number of keys (reference grids) and the instructions for creating a character grid whenever a clear character is fed to the word processor or other device and a key is selected. In other words, each key (reference grids) generates a font corresponding to any clear font fed to the device. The operator need only select a key, and, when he comes to the part of the text that is to be coded, give the appropriate command in any suitable way and give once again the same command or a different command when he wishes to return to clear printing. The commands will be of the type "START CODING" and "END CODING", these commands being represented on the screen by suitable signs. Alternatively, the passage to the coded font could be effected by depressing a key, in the way in which in ordinary keyboards capitals are obtained by depressing a "CAPS LOCK" key; or by depressing a key which also generates a correspondence mark at the beginning and at the end of the coded text. Further, a number of clear fonts may be included in the program fed to the word processor or other device, in place of or in addition to the fonts that are present in the said processor or device.

It will also be clear that different coded fonts may be created, not only by employing clear characters in different reference grids, but also by employing different conventional fonts, e.g., the coded font may be created by ideally or actually superimposing each of the conventional fonts, which the word processor can use, to the same reference grid. If the font is, e.g., in bold characters, the coded font will correspondingly be bold. This permits to obtain a variety of effects by carrying out the invention.

A text which is partly or completely coded may be composed, using the coded fonts, on a text composing device, e.g. a word processor, in exactly the same way as a normal, clear text is composed, and may be checked on the screen of the word processor or other device, in the usual way. If the coded fonts are stored in the text composing device, the characters shown on the screen will preferably be in the conventional, directly readable font, although they might also be in the coded font. In any case, all that the operator has to do is to compose the text like any normal, clear text, and give the appropriate commands to determine which parts of the text are to be coded. The operator will then cause the composed text to be printed in the usual way, by whatever printer is at his disposal.

When the coded text is to be read, according to an embodiment of the invention, a reference grid will be printed on a transparent sheet of paper. Transparent sheets carrying all the reference grids that may be used will usually be prepared previously and the reference grid corresponding to the font used will be selected in each case. A reference grid can be obviously printed, e.g., by giving the START CODING and the END CODING commands, separated by a blank space.

In one embodiment of the invention the composed text is impaginated and correspondence marks are provided at least on each page or possibly on each predetermined portion of a page. Depending on the nature of the text and of the coded fonts, and on the degree of precision desired, as well as on the size of the text characters, correspondence marks of different kinds may be used. For instance, a printed word may serve as a correspondence mark, or a graphic sign of any kind may be used, as, for instance, a cross or a circle or the like. It is convenient, in a preferred embodiment of the invention, to use pairs of relatively simple graphic signs.

In said embodiment, the commands determining the beginning and the end of the coded text may also cause the printing of a correspondence mark. In this manner, each coded text portion—graphic character or characters, word or number of words—will be provided with its own correspondence marks, in its immediate vicinity, thereby facilitating the alignment. In this case, the transparent sheet will carry a number of reference grids of different lengths, each provided with reference marks, and in each case the reference grid will be used which has the same length as the coded text portion to be read. Mechanical alignment means, however, can also be provided. Thus, if the text is printed on a substrate which has predetermined dimensions such as e.g. a card, and in a predetermined position thereon, the transparent sheet may be formed and printed with the same dimensions and the same position of the reference grid, and may be aligned with the substrate by inserting them in a common frame adjusted to their dimensions. The transparent sheet may also be permanently mounted on such a frame. Or, alternatively, perforations can be provided in both the substrate and the transparent sheet, to permit alignment by means of pins. A variety of mechanical solutions can easily be devised by skilled persons.

FIG. 5 represents a transparent strip, with the reference grid shown only schematically—viz. as uniformly shaded—for simplicity of illustration, and with reference marks in the shape of crosses. The strip will be at least as high as a coded character and may be as high as an entire printed page, but generally its size will be intermediate between those two extremes and it will be high enough to cover a number of lines of the printed text. Its height will be determined in such a way as to satisfy several requirements. It must not be so large as to cover an area in which significant dimensional accuracies may arise in the printed page. However, it must not be so small that its use will be inconvenient and that too many pairs of correspondence marks will be required in the printed page. Each strip will carry reference marks that are sufficiently correct to position it on the printed page. If such marks are in pairs, as in the example illustrated, the strip will have at least one pair of them, but it may have a plurality of pairs, depending on its height and on the dimensional inaccuracies that are likely to occur in a portion of the printed page having the same height.

In a preferred embodiment of the invention the transparent strip will include several repetitions of the same reference grid set side by side. The reference grid, in general, will have a width that is of the same order of magnitude as its height, while a printed line, and therefore the transparent strip, may be much wider. Thus the strip may comprise a number, say, e.g., ten to twenty, but quite possibly less or more, of identical reference grids or of different repetitions of the same reference grid. The distance between homologous points of adjacent grids may be called the "horizontal pitch" of the reference grids in the multi-grid strip. The shaded rectangle of FIG. 5 may optionally be taken as schematically representing such a multi-grid strip. If such a strip is used, the printer will be so programmed as to print adjacent character grids in such a way that their homologous points will have the same mutual distance, viz. the "horizontal pitch" of the character grids in the multi-grid strip. It is clear that when this latter is superimposed to a printed line, all the coded characters in the line will register with a reference grid and will become concurrently readable. Further, the transparent strip may be high enough to cover more than one printed line, say to cover "n" printed lines. In this case its height will be at least equal to "n" times that of a printed line plus "n−1" times the vertical pitch between printed lines. The several reference grids will then be distributed in the strip not only side by side, but also the ones below the other, viz. if the strip covers "n" printed lines, the reference grids will be distributed in "n" rows, having the same vertical pitch as the printed lines, each row comprising a plurality of reference grids side by side. This arrangement will be effective on the sole condition that the coded character be printed in such a positioned relationship on the page, that when the transparent strip is superimposed thereto and the correspondence and reference marks are aligned, each character grid will be exactly register with a reference grid. The software required to achieve this can easily be provided by skilled persons.

The transparent sheet on which a reference grid is printed should be dimensionally stable. Dimensionally stable transparent plastics are known and the art knows how to print thereon words and graphic signs. The transparent sheet will carry the same marks as those used as correspondence marks on the printed page, which have been designated as reference marks. A complex reference sign can be used for each page or, more conveniently, a pair of simple graphic signs, or a plurality of pairs of graphic signs for each page. The reason for using a plurality of graphic signs as reference marks is that there may be some dimensional irregularities in the printed page or in the transparent sheet and therefore if only two reference signs are used for an entire page, the dimensional irregularities might make the superimposition of the printed text to the reference grid imperfect and the coded font characters would not be easily identified. In order to minimize the consequences of dimensional irregularities, one may either print on a single page a plurality of pairs of reference signs, or provide, instead of a transparent sheet having the size of a printed page, a transparent strip having a height that is equal to the height of one or a few printed lines, and print on the printed page a plurality of pairs of reference marks for each strip of the page having the size of the transparent strip.

FIG. 6 represents the same portion of page shown in FIG. 1, wherein the answer to the question is represented by character grids and correspondence marks are printed at the sides of said grids. If several answers were present on several lines, pairs of correspondence marks would be provided at suitable intervals, e.g., intervals equal to the height of the transparent strip of FIG. 5. Thus, said strip may be slid up or down along the page and its reference marks successively aligned with the various pairs of corresponding marks and any desired portion of the page can be covered in this way. Of course, if the transparent element were a sheet as high as the whole page, only one pair of correspondence marks would be strictly required, but for greater precision, several pairs could preferably be provided both in the printed page and on the transparent sheet.

FIG. 7 shows how the transparent strip of FIG. 5 is superimposed on a pertinent portion of FIG. 6 to read the coded answer. In the clear grid shown therein, the clear character is seen as black on a gray background, which is a random mixture of white and black pixels.

Figure 8:
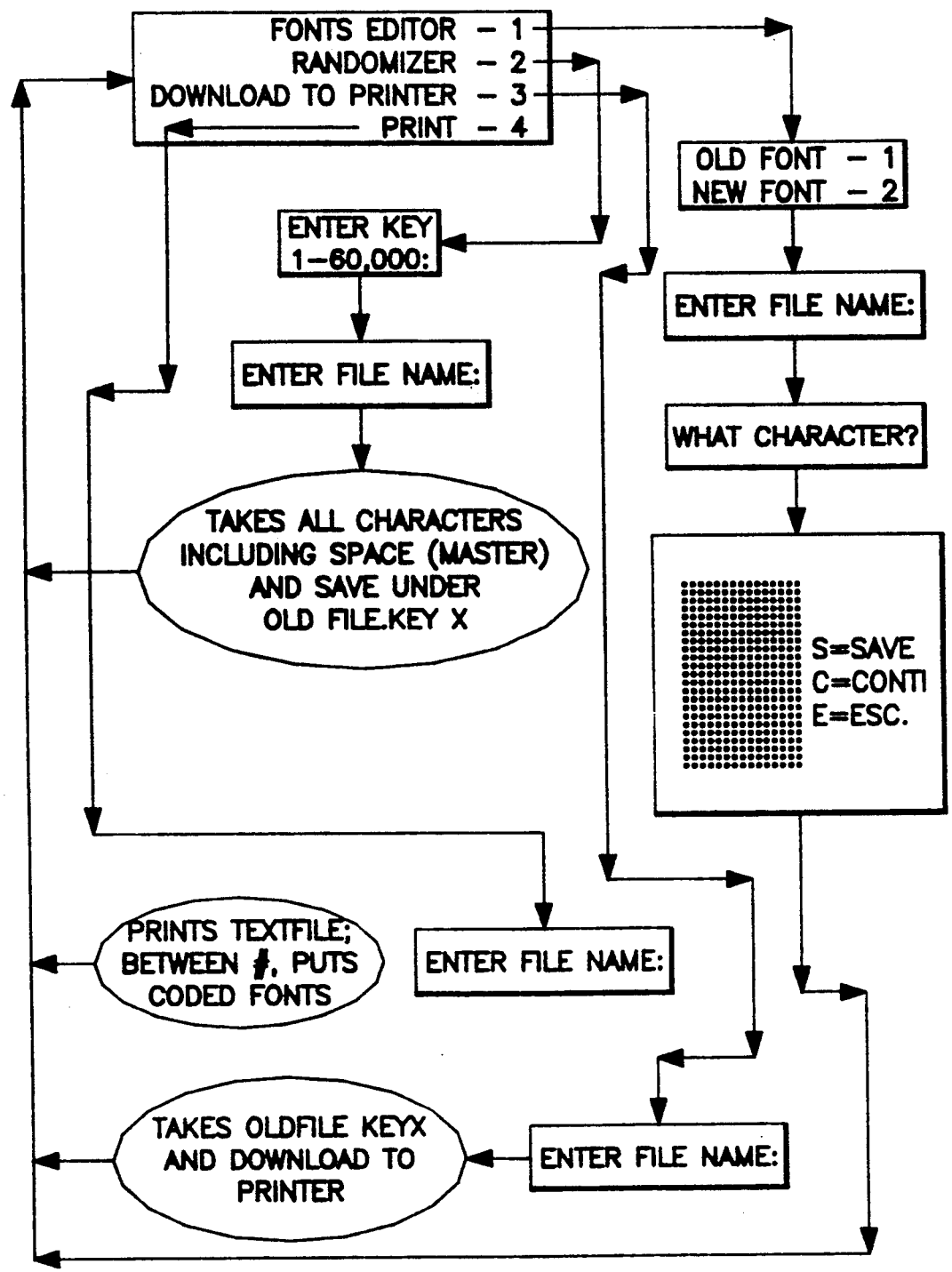
FIG. 8 illustrates in flow chart form a way of carrying into practice an embodiment of the apparatus according to the embodiment of the preceding figures.

FIG. 8 schematically illustrates a particularly simple way of carrying the invention into practice, e.g. by means of a program and an associated printer. The program will comprise a randomizer, which is able to construct random or, with the suitable program modifications, scrambled reference grids. Each reference grid is identified by a numeric key. Since a large number of random grids may be constructed, the keys are here assumed to be from 1 to 60,000. To construct a coded font, a key is firstly chosen. The program also has a number of files, identified by name, comprising all the plain characters which it may be desired to use, defined on the blank grid, as shown in FIG. 3. A file will be chosen by name. The program will then construct, in the manner explained hereinbefore, all the coded characters corresponding to the chosen reference grid and the chosen plain character file, and save the resulting coded font under any suitable identification, depending on the key and the file. The coded font can now be downloaded to the printer and stored therein. If it is wished to print a text that will be partly in plain and partly in coded characters, the name of the file chosen for constructing the coded font will be entered and the printer will print with the plain fonts which are normally available to it, inserting the corresponding coded characters between the "code" marks, indicated in the figure by #. If it is wished to modify a coded font thus constructed, the editing command will be given and the file identified by its name. Any coded characters that it is wished to modify will now be called up one by one, the processor screen will show the corresponding grids, the required modifications will be made on the grid, and the result will be saved, until all desired characters have been amended. The new file will be the basis for constructing a new, amended coded font.

The invention can be carried out in the course of a normal printing operation, since all that is needed, besides the normal manipulations, is to depress one command key. No such simple and efficient way of assuring privacy, has been taught in the prior art, as far as the applicant knows.

In a preferred from of the invention, as hereinbefore noted, the coded text is scanned, the digital values of each cell of each scanned character grid is compared with the value of the corresponding cell of the reference grid, and the XOR-rule is applied to the results of said comparison. The resulting clear grid has a white background (composed of cells having the zero value), evidencing the clear character composed of black cells (having the 1 value).

In a preferred embodiment of the invention, the means for visualizing the clear characters may consist of or comprise means for displaying and/or printing the same. Preferably, said visualizing means comprise means for providing a sharp color contrast between clear characters and background, e.g., for printing the characters in a color, preferably black, and the background in a sharply contrasting color, preferably white. When the reference and character grids are linear, the visualizing means comprise means for displaying and/or printing the clear characters corresponding to predetermined character codes.

In an embodiment, said means for identifying and visually differentiating character grid cells are structurally associated with the scanning means. In an alternative embodiment, they comprise computer means. In a further embodiment, they comprise a XOR gate, which may be, as is known, defined as hardware or software.

In a still further embodiment, means are provided for detecting and compensating for changes in scale, horizontal and vertical, which occurred in the character grids before their presentation to the scanning means, and optionally for any angular deviations between the grid axes and the directions of scanning.

Preferably, the digital values are identified, and the scanning is effected, optically or magnetically.

As noted, in a preferred form of the invention, the digital values related to cells of the various grids used are only two, 0 (or white) and 1 (or black), and correspondingly the cells of the clear grids which form the clear characters, viz. the cells which have the 0 or the 1 value where the corresponding reference grid cells have the 1 or the 0 value, respectively, are visually differentiated from the background by using a color, e.g., black, for the ones and a different color, e.g., white, for the other. Instead of white or of black, gray can be used, e.g. by rendering the clear characters (or the background) black or white, and leaving the background (or clear characters, respectively) in the form of a scrambled grid, viz. a random or close to random mixture of whites and blacks.

Figure 9:
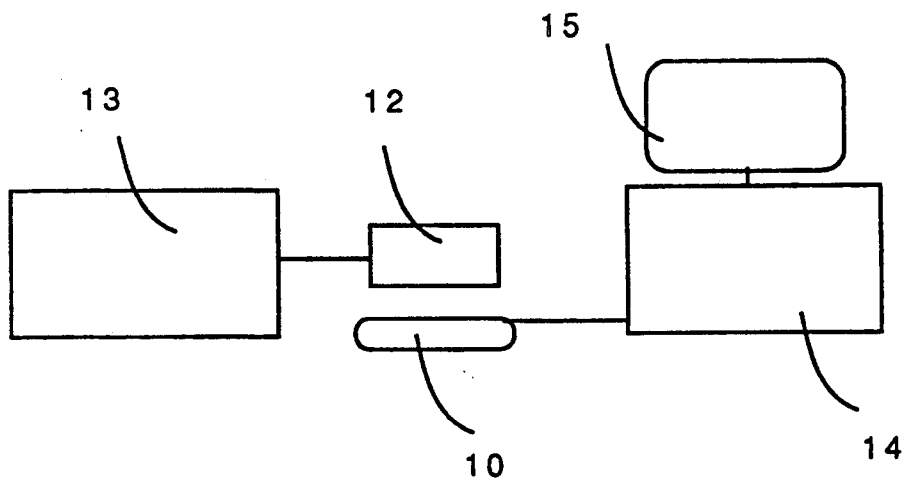
FIG. 9 illustrates in block diagram form an apparatus according to another embodiment of the invention.

In the block diagram of FIG. 9, 10 indicates a scanner to which such a text 12 is fed. The text may originate from a printer or may be conveyed to the scanner from any other source. In particular, in a preferred embodiment of the invention, the text is in the form of a copy transmitted by a fax receiving machine, schematically indicated in broken lines at 13 in FIG. 9. Scanner 10 may be of any known type. The scanner builds an image of the text, in this case the coded portion thereof, consisting of black and white pixels. The fineness of the pixel distribution is generally much greater than that of the character grids used in carrying out the invention, although it suffices that it should not be smaller. E.g., the scanner may register 400×400=16,000 pixels per square inch, whereas a character grid, as preferably used, may have between 100 and 10,000 cells per square inch. In the embodiment of FIG. 9, the scanner conveys information, relative to the digital values of the scanned grid cells, to a microcomputer 14. Said microcomputer either stores the reference grids which may have been used to construct the character grids comprised in the text to be read, or is so programmed as to construct any one of a number of reference grids, the latter solution being preferable if the number of possible grids is high. In either case, each grid is identified by a code, e.g. a number. The operator feeds the code to the microcomputer, or this code is included in the text and revealed by the scanner, and this either selects and loads or constructs and loads the corresponding reference grid. If the text is sent by fax, and the reference grid has not been previously chosen and made known to the addressee of the message, the grid code must also be sent. In this case, if particularly high security is desired, the code which is sent may not be the grid code, but only constitute an input from which a subroutine or program, stored in computer 14 or elsewhere, derives the grid code. Instead of a combination of a scanner with a general computer, a unitary device could be constructed according to the invention, which embodies a scanner and special computer circuitry comprising a random generator, means for selecting the desired reference grid to be created by it, and means for comparing, for each coded character grid, the optical information obtained through the scanner with the reference grid.

Figure 10:
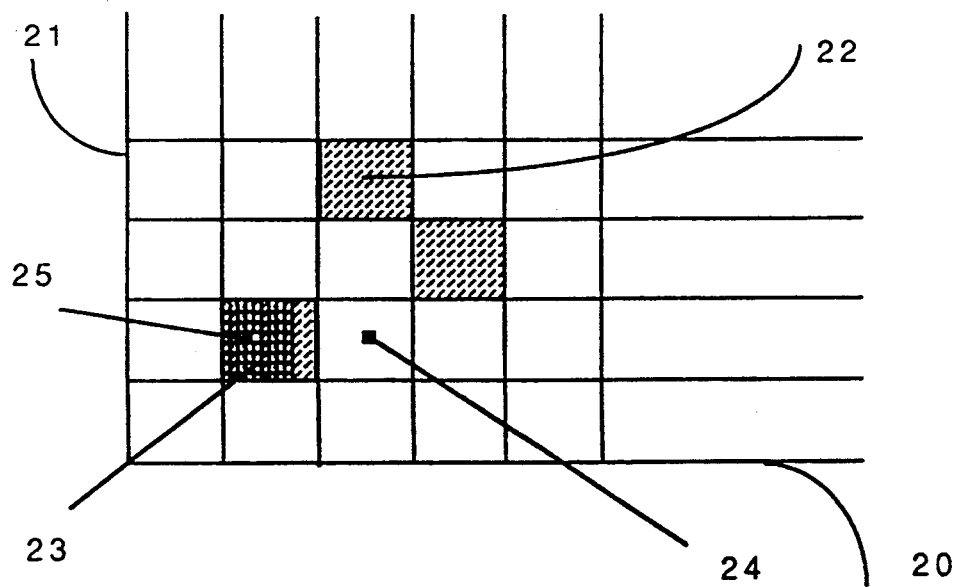
FIG. 10 schematically illustrates the manner in which a clear character is reconstructed from the information provided by a scanner.

Assuming, for the time being, that no changes of scale or deformations of any kind have been produced or have occurred in the character grid, the situation will be as depicted in FIG. 10, in which, for the purpose of using a sufficiently large scale, only a few cells of the blank grid are considered. The microcomputer will compare the optical information received from the scanner with a blank grid corresponding to the particular reference grid to be used. The blank grid of FIG. 10 is Cartesian and composed of abscissae 20 and ordinates 21. A few cells 22 thereof are shown. The pixels 23 are those registered by the scanner. Ideally, each grid cell 22 should be filled either with black pixels 23 or with white pixels, and be correspondingly considered by computer 14 as a 1 (black) or 0 (white) cell. In practice, small, random irregularities may occur and there may be erroneous pixels—such as one or some black pixels 23 falling in a cell adjacent to their proper one and which should be entirely white, as shown at 24; or one or more white pixels falling in a cell which should be entirely black, as shown at 25—but the computer will correct such errors and consider a cell to be black (or white) if it is predominantly black (or white). The blank grid, when so filled with digital values derived from the optical information from the scanner, can be called "a scanner grid".

Computer 14 compares the resulting digital value of each scanner grid cell with that of the corresponding cell of the reference grid, e.g., by means of a XOR gate, provided as an element of hardware or through software. The resulting output is fed to a visualizing device 15 (FIG. 9) which may be a printer or a display or any other suitable device. Device 15 visualizes the resulting picture of the clear character, represented by the character grid that has been scanned, by printing or displaying a black dot in each cell in which the scanner and reference grid values are opposite (1 or 0, instead of 0 or 1, respectively); or printing or displaying the entire cell in black, and leaving the other cells unprinted, viz. white. Instead of black and white, any other contrasting colors or any other kind of visually detectable contrast could be used.

Of course, there is no need to scan the entire printed text, most of which can be in clear characters, and this would be a waste of time. Therefore, only the coded parts of the text will be submitted to the scanner. Nevertheless, control of the scanning cannot be so accurate that only information pertaining to the coded text portions is submitted to the computer. It is therefore desirable to print in the printed text, at the beginning and at the end of each coded part, a spacing sign or signs of any kind that will indicate the beginning and the end of a coded text segment, and which can be designated herein as START COMPARING and STOP COMPARING signs. Such signs may be conveniently inserted in the text when the START CODING and END CODING commands are given in composing the text, as explained in the parent application. The STOP COMPARING sign may also contain the indication of the number of character grids which have been inserted between the two signs. When the computer receives the START COMPARING sign, it will begin to superimpose to the optical information received from the scanner a succession of blank grids, and will continue to do so until the STOP COMPARING sign appears. At that point, if there have been no scale changes or other deformations in the grids, the number of said blank grids will be identical to the number of character grids indicated by the STOP COMPARING sign. If there is a difference between the aforesaid two numbers, the computer will add the missing grid or grids, or cancel the supernumerary ones.

At this point, there may be a difference between the horizontal spacing between the two signs and the overall length of the succession of blank grids. This will indicate a change of scale, whether planned or accidental. The computer will compensate for such a change either by adjusting the scale of the blank grids, or, preferably, by enlarging or reducing the picture provided by the scanner. If, e.g., the coded text has been transmitted by fax and has shrunk by 10% in the proceedings, the computer will increase by 10% the distance between the pixels or, alternatively, the number of pixels and the spacing between groups of pixels, received from the scanner.

Vertical changes of scale could be compensated in like manner, by providing reference signs which will indicate the vertical positions of the beginning and end of each row and comparing them with the beginning and end, in a vertical direction, of the groups of pixels defining each row. In this way vertical shrinkage (or dilatation) can be compensated for. However, the vertical spacing between rows is generally not critical, and small variations thereof need not be corrected. The height of each row of character grids, on the other hand, is often critical. It may occur that in transmission by fax a row is vertically stretched out or compressed, and this will result in deformation that may well prevent an accurate decoding. By this improvement, the vertically stretched or compressed rows are rendered readable.

Figure 11:
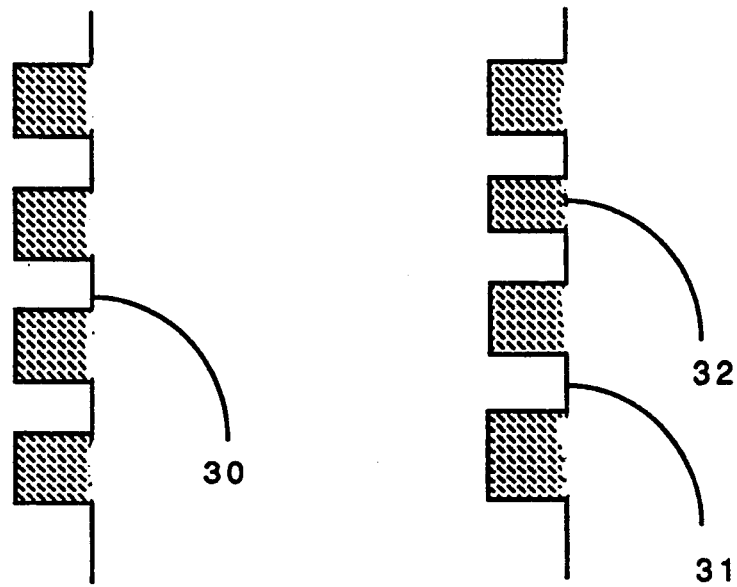
Figure 12:
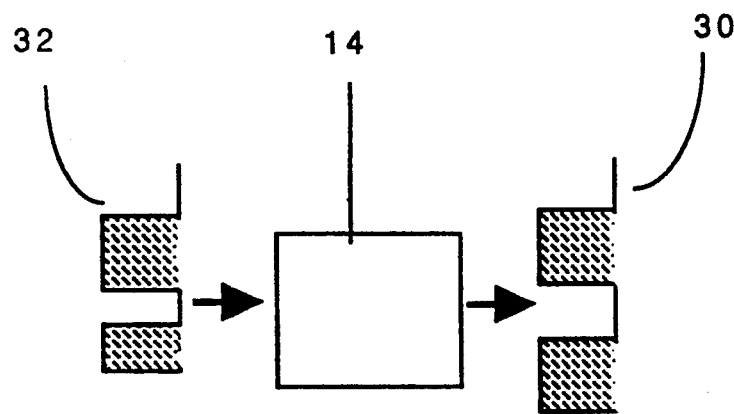

This is illustrated in FIG. 11. When printing the coded text, it is known how high and how distant the rows of coded print should be. This is diagrammatically shown by shown by square wave line 30, in which the shaded areas indicate the vertical locations of the coded print: the height of each shaded area is that of a row of coded print and the distance between areas is that between print rows. Likewise, square wave line 31 shows the vertical distribution of the rows of coded print after transmission by fax. In this case, the distances between rows have not materially changed, and if they had, this would not, anyway, be critical; but one of the rows, indicated at 32, has been compressed to one third of its true height. A coded sign, e.g., a number of dots placed at the top of each printed page, will indicate the height which the character grids should have (which, of course, is the same as long as they have been made from the same reference grid). The scanner will have read the sign and transmitted the information, which it represents, to computer 14. Computer 14 will register the fact that the height of row 32, as seen by the scanner, is smaller than that defined by the said information, and will multiply the number of pixels of said row 32 in the appropriate ratio, as schematically illustrated in FIG. 12, thereby reconstituting the true coded row.

The signs hereinbefore described, or other signs provided for this purpose, also define the orientation of the character grids. If the grids are, as they usually are, Cartesian, they are parallel to an abscissae and an ordinates axis. The scanner is often passed over the text at an angle with the print lines, and scans the print at a slant. In order to compare the optical information provided by the scanner with the character grids, it is necessary to insert it in a blank grid to create a scanner grid, and this requires that the scanned lines be parallel to the abscissae axis of the grid. This is shown in FIG. 13, in which the START and STOP COMPARING signs, 50-51, are assumed to be used as orientation references, and are cross-shaped. The figure shows that the lines are seen by the scanner at a slant, since the scanner is oriented as shown by lines 53. In order to construct the scanner grid and carry out the other operations described hereinbefore, it is necessary to compensate for this slant and place the blank grid parallel to the lines of print. This is done by the microcomputer or microcircuit means, based on the angle a between the reference signs and the orientation of the scanner.

In a variant of the invention, the coded text that is to be read and fed to the scanner has been deliberately changed in scale to some usually small extent, either through its transmission by fax or in any other way. When this is done, an unauthorized person who might have obtained the reference grid in graphic form on a transparent sheet, or might somehow have reconstructed it from the analysis of a number of coded texts, will not be able to read this particular coded text in the normal way, viz. by superimposing thereto the reference grid, but authorized persons, who are in possession of the code which identifies the reference grid used, and only they, will be able to read the text by means of this improvement. In this way, texts can be transmitted with two degrees of security: ordinary security is obtained by coding part of the texts, and can be broken only by obtaining or reconstructing the reference grid; enhanced security is obtained by changing the scale of the coded text, and can be broken only by obtaining the reference grid code.

In another variant of the invention, the character grid comprises a number of sections. The first section is constructed on the basis of a first reference grid, and a code identifying said grid is sent to a computer, such as computer 14 of FIG. 9, or a like device, or is marked on the text itself. The scanner reads the first section and the computer identifies the grid code, which is not visualized and which corresponds to the reference grid on the basis of which the second section of the character grid has been composed. The computer then selects or builds said reference grid and compares said second section with it. If the character grid only contains two sections, the content of said second section is a clear character, and this latter is visualized and the decoding process is completed as to that character grid. If the character grid contains a third section, the content of the second section will be a second grid code and the process described will be repeated: the computer will identify said second grid code, select or build the corresponding reference grid, and compare said third section with it. The process may be repeated with any number of sections. Alternatively, the coded text will contain a first grid which defines a grid code and the remaining character grids will be compared to the reference grid thus identified. Or, the two alternatives may be combined.

An embodiment of the invention in which the grids are linear is illustrated in FIGS. 14a to 14c. FIG. 14a shows a row of digital values, which constitute the reference grid, shown as greatly abbreviated with respect to what it would normally be in actual practice. FIG. 14b is the corresponding character grid. FIG. 14c diagrammatically illustrates the comparison of the two grids: the raised segments 60 indicate zones in which the digital values of the two grids are opposite. The diagram of FIG. 14c can be interpreted as a linear grid as shown, in which the segments 60 indicate the 1 values and the segments 61 the 0 values. Said linear grid constitutes a grid code. As in all other embodiments of the invention, the character grid has been printed and scanned and the results of the scanning has been transmitted to a computer, such as 14 in FIG. 9, or like device. A code identifying the reference grid has been sent to the computer or is incorporated in the text and read by the scanner. The computer selects or builds the reference grid of FIG. 14a and compares it with the character grid of FIG. 14b, whereby it recognizes the code of FIG. 14c. The computer then selects the character which corresponds to that code, in the conventional correspondence which has been established for carrying out this embodiment of the invention, e.g., in the same way in which it would select a character according to the corresponding ASCII symbol, and causes said character to be visualized.

As already stated, it is a purpose of this invention to provide means for authenticating documents or tickets or cards and the like, comprising printed matter that is partly coded, and when read in decoded form by an authorized person will prove or disprove with certainty that the document has indeed been issued by the person indicated on it as its originator or to the person who bears it, and will optionally provide additional pertinent information.

In particular, it is a purpose of this invention to provide means by which: a) the fiscal authorities may ascertain, speedily and without difficulty or expense, whether any specific, fiscally relevant document is authentic, and especially whether it has been issued to or by the person or company purporting to have issued it; b) any company, public office or institute may ascertain whether a specific document, such as a certificate or diploma, has actually been issued by it; c) control personnel may speedily ascertain whether a person, exhibiting a ticket or card for admission to any premises, is the person to whom said ticket or card has been issued, and who is authorized to make use of it—all this without requiring any alteration in the document to be authenticated or any unusual provision in preparing it, such as, that it be printed on special paper or with special ink and without the use of sophisticated or costly equipment, or the use of special techniques.

This is achieved by an embodiment of the process of the invention, which comprises the steps of providing, on a backing associated with the item, such as a document, ticket or card, to be authenticated (which backing may be the item itself, or a sticker or the like to be applied to it), a text which comprises data that are coded by the process of the invention, said data being such that their comparison with the data marked in clear on the same or another related item permits to authenticate the item or recognize it as counterfeit, and whenever the authenticity of the item is to be checked, rendering the coded data readable and identifiable by superimposing a transparent sheet, carrying the reference grid or scanning the coded data and identifying therein the cells of the character grids in which the digitizable values are different from those of the reference grid, as hereinbefore explained.

The backing on which the coded data are printed may be a sticker to be applied to the item or it may be the item itself.

The coded data may comprise identity data, that are exclusive to a single item, such as a bill number or the like, and/or additional data, in clear or coded form.

FIG. 15 shows the letterhead, the fiscal registration number and the bill number, appearing on a bill for goods supplied, alleged to be a bill No. 937 issued by Joseph Smith and Co., VAT number 7988451. To authenticate said bill, a sticker is printed in coded form. The data printed on the sticker should have a relationship to those carried by the bill, such that is apparent to anyone viewing them, but cannot be guessed by unauthorized persons, as they do not conform to a general rule that can be learned by the comparison of a few unrelated cases. Said data are chosen by the issuer of a bill, and should comprise letters identifying it. In this instance, it is assumed that the firm Joseph Smith and Co. has chosen the letters "Josth". Anyone reading those letters will see the relationship to the firm's name, but whoever should wish to counterfeit a bill to make it appear as issued by said firm, will not know what letters to choose. The firm, further, may change the letters from time to time and use, e.g., instead of "Josth", "phSm". Another way of preparing the sticker, is to use the entire firm's name, or a main part of it—e.g., in this case, "J. Smith"—but print it in a font different from that of the letterhead. A person wishing to counterfeit a bill might guess the use of "J. Smith", but not the particular font used, which also may be changed from time to time. Still another way of preparing the sticker will be to register on it the registration number, or the last few digits thereof—again, optionally, in a font different from that of the letterhead. Additional indications may be added, and one that is highly desirable is the ordinal number of the bill, in this case 937. This will be a safeguard against the danger of a number of stickers of the firm being stolen: the thief will not know what number is marked in coded form on each of them, and will be unable to prepare a counterfeit bill bearing the same number as the particular sticker which he uses. The data to be printed in coded form for the bill of FIG. 15 are shown in FIG. 16.

Said data are then coded by using a specific reference grid. If the document is to be authenticated only by the issuer, this latter will be the only one to posses the reference grid. If it is to be authenticated by a controlling authority, e.g., by a tax office, this latter will decide what reference grids should be used, and, e.g., will assign different reference grids to different areas of the country and to different fiscal periods, e.g., years or parts of years, or according to any other criterion. The reference grids will be printed only by an authorized, supervised printer and will be kept only by the controlling authority. Persons or companies that intend to issue bills, e.g., that are registered with a VAT office, will order their stickers from the said authorized printer, only to whom they will communicate what should appear on the stickers. The printer will know in each case what reference grid to use, according to the instructions of the controlling authority. The data of FIG. 16 will appear in coded form on the sticker, e.g., as shown in FIG. 17.

The sticker will be attached to the bill, taking care that the ordinal number be the same on the bill and on the sticker. When the books of the person or company that has paid, or alleged to have paid, the bill are checked by a tax controller, this latter will carry with him a number of keys, viz. transparent sheets bearing the reference grids. These are only small pieces of transparent sheet material and are easy to carry, but only a limited number is required in practice, e.g., if the territory covered by the fiscal authority is divided into 10 districts and 5 years are to be covered, 50 keys suffice. The tax controller will find among them the key corresponding to the zone and the period of time in which any bill that looks suspicious has been issued; but if not, he will note the relevant particulars of the bill and return later with the appropriate key, or request that the bill, or a Xerox copy thereof, be brought to his office for control. By merely superimposing the key to the sticker, he will ascertain whether this latter bears the correct indications and is therefore authentic, or not.

There is no way in which a counterfeiter can pass such a control. He might learn from an unfaithful employee the data by which a given company identifies itself on the stickers, but he still will not be able to have the stickers printed, since he does not have the reference grid. For the same reason, he will not be able to issue bills in the name of an imaginary supplier, as is done sometimes by counterfeiters, since he will not be able to have stickers printed bearing its imaginary identification. He might come into possession of a number of stickers of a given company, but still he will not know the bill numbers marked on them and will be unable to have counterfeited, matching bill blanks printed.

Other data, coded or not, e.g., bar codes, may be added to the sticker, but these are not a part of the invention.

Authentication of any documents other than bills may be carried out in the same way, with the obvious modifications if the person or company or institute that issues the document is also the one that authenticates it, and therefore the one decides which reference grids are to be used and keeps the same.

If the coded data are decoded by the embodiment of the invention which comprises scanning means, the controller of the document will carry with him, instead of a number of keys, a scanner coupled with suitable computer or microcircuit means. Such devices can be relatively inexpensive and light to carry, and their operation requires only a moderate training and skill. The various reference grids are then stored in the scanner and/or computer or microcircuit memories, and an extremely large number of such grids can be thus stored, so that the controller will be able to control any bill or other document that looks suspicious, by loading the appropriate reference grid. Since the grids are identified by codes, all that the controller needs to carry, besides the device, is a list of the codes relative to the possible zones and periods of time or other criteria of choice of the reference grids. Usually, it will be enough for him to feed to the computer or microcircuit the district number and the year, to which any suspicious bill refers, and to scan said bill. The device will automatically load the appropriate reference grids, will construct a scanner grid and compare it to the reference grid, identify the cells of the two grids which have different digital values (generally 0 to 1 instead of 1 or 0, respectively) and visualize said cells, which define the clear configuration of the data, preferably on a display provided in the device—all as hereinbefore describe. All these operations will be carried out almost instantaneously, so that the tax controller will immediately read on the display the data coded on the document, and check whether they are the correct ones. This way of decoding the data carried by the documents permits easily to deal with situations in which a large number of keys would be required, such as when several districts are to be covered; however, it may be preferably even when the number of keys is moderate, as it involves a simpler manipulation.

The use of scanners is also useful when tickets or admission cards are to be checked, especially when they have been sent by mail, as it often happens, and there is a danger that, if they are valuable, they may be stolen. In this case the check must be practically instantaneous, as the tickets or admission cards may be exhibited in rapid succession by visitors, spectators or participants in meetings, seeking admission. Such persons will present the ticket or card, together with an identity document, to the checker at the entrance to the pertinent premises; the checker will scan the ticket or card and read on the display of his device, or on a fixed display, the name or other identity datum coded thereon, and verify that it corresponds to that of the identity document. This can be done very quickly, without delaying the stream of admission seekers.

The decoding by scanning permits to carry into practice another embodiment of the invention, which provides higher security. The printed, coded item— whatever it is and whatever the document with which it is associated—may comprise two or more successive segments. The first segment is coded according to a reference grid or key that is communicated to the checker, and may be changed at relatively long intervals. The second segment is coded according to a different reference grid, which may differ from group to group of items, e.g., documents or tickets, and which is identified by a grid code that is printed, in coded form, in the first segment. The computer or microcircuit will select or build the first reference grid, based on the information fed to it by the checker, read the grid code marked thereon without visualizing it, select or build a second reference grid identified by said grid code, and read and visualize the coded data marked on the second segment of the printed item. This operation can be repeated once or several times more, by providing three or more segments in the coded print.

The apparatus for carrying out the process according to the invention, when decoding is dine through scanning, may comprise a scanner and a computer connected thereto, provided with a display and programmed to carry out all the necessary operations, as described hereinbefore. Alternatively, a single structural unit may be provided, which embodies scanner, display, and microcircuit means adapted for carrying out the aforesaid decoding operations, which microcircuit means may be hardware designed solely for that purpose, or may be more general-purpose and be suitably programmed. All such devices for carrying out the process according to this improvement invention are a part of this latter.

It will be evident from the foregoing embodiments how the invention may be carried out for authenticating any document other than a fiscal document or a ticket or admission card. The coded data may be printed on a sticker, which is applied to the document, or may be printed directly on the document when the identity of the bearer thereof is not important, or is to be checked in other ways. For example, an institute which releases certificates or diplomas, such as a university, may print on each of them coded data that will permit to ascertain its authenticity, even after a considerable time, by decoding them by means of keys or scanner devices, based on reference grids, the definition of which is known only to the university.

Likewise, a bank may assign to each of its clients a number or other code, known only to the bank and to the client, to which a given reference grid corresponds. This can be done easily, since e.g. the number of different 20×20 random grids which can be constructed using two digital values is $2^{40}$, which is a number far exceeding the earth's population, and the number can be greatly increased by using two or more grids in combination, as explained hereinbefore. Each client will be provided with means, such as a diskette carrying a program, for constructing only his reference grid. Then he can send any instructions to the bank and print on them his name in coded form, and the bank can decide it and check that the instructions originate from him. There is no way in which anyone can counterfeit such a "signature", unless one not only knows the client's code, but also has access to the random generator, e.g. to the computer, in which the correspondence between said code and a given grid has been stored. Not even the bank's personnel can counterfeit it, for the bank's computer may be so programmed as to read coded matter, but to be unable to write it.

As already mentioned, the text that is visualized may not be the same that has been coded, as long as it bears a known relationship to it. Thus, e.g., the blank checks issued by a bank can bear the name of the holder or other agreed mark, in coded form. When a person claiming to be the account holder wishes to cash one of checks at a bank where he is unknown, the bank teller will scan the coded characters. The account holder will then enter into a computer, connected with the scanner, his personal code number or other code (which only he knows) by means of keys which only he can see, so that his code will remain secret. The coded characters will be uncoded by the computer on the basis of the reference grid corresponding to the code that he has entered. If the code is the correct one, the uncoded characters will spell the account holder's name or other agreed mark, while if it is not, they will spell something else and in general something meaningless. An approval or a disapproval will correspondingly be displayed by the computer. Additionally, other information can be displayed that is associated with the bank holder's code, e.g. a limit to the sums that can be cashed by him. In like manner, a person using a credit card can prove that he is the card holder, a person having an entry permit or a ticket can prove that he is to person to whom it was issued, and so on, by having coded characters marked on the card, permit or ticket and uncoding them by entering his own personal code. In every case, the person carrying out the control—bank teller, gate guard and so no—will not be able to forge the coded characters. In general, in a variety of applications of the invention, the clear characters can be visualized not as they actually are, but through some information connected to them.

We claim:

1. Process for composing a printable text, comprising coded characters, by:
    1. defining, at least ideally, at least one blank grid;
    2. creating a reference grid consisting of a scrambled distribution, as hereinafter defined, of at least two digitizable values in the cells of the blank grid;
    3. creating at least one coded font by:
        a. individually comparing each digital value of each character to be comprised in the font to the corresponding digital value of the reference grid; and
        b. changing the digital value of the reference grid whenever the corresponding digital value of the character is one of the two possible values, and leaving it unchanged whenever it is the other possible value, whereby to create a scrambled character grid which represents the character;
    4. storing in a memory commands for alternatively selecting characters or character grids, as desired; and
    5. defining by means of a text composing device the desired text, wherein the clear characters are represented in a conventional way and the coded characters are represented by the corresponding character grids, whereby to compose the text.

2. Process for producing a printed text, comprising coded characters, which comprises composing a text by the process of claim 1, wherein the character grids are stored in the memory of a print-controlling device, and printing the composed text by graphically defining: a) any clear characters in the conventional way, b) any coded characters by signs representing the digital values of the respective character grids.

3. Process for producing and reading a printed text comprising coded characters, which comprises producing the text by the process of claim 2, and subsequently identifying the cells of the character grids in which the digital values are different from those of the reference grid, and visualizing each of said character grids in decoded form as a clear grid having the same dimensions as the character grids, wherein said cells having different digital values are differentiated from the background, whereby said differentiated cells form the clear characters corresponding to the scanned coded characters.

4. Process according to claim 3, wherein, in order to identify the cells of the character grids in which the digital values are different from those of the reference grid and to create the clear grids, a copy of the reference grid is provided on a transparent sheet, and correspondence marks are provided on the printed and optionally impaginated text and on said transparent copy, whereby when said transparent copy is superimposed to the printed text, so that a reference grid is superimposed to each character grid which is to be read, the coded characters become detectable in clear form and identifiable.

5. Process according to claim 3, wherein, in order to identify the cells of the character grids in which the digital values are different from those of the reference grid and to create the clear grids, at least the coded part or parts of the printed text are scanned, the digital value of each cell of each scanned character grids, as detected as black or white in the scanning, is compared to the value of the corresponding cell of the reference grid and the clear grid is created by applying the XOR-rule to the results of said comparison.

6. Process according to claim 1, comprising printing the composed text, transmitting the same by telecopier, and scanning, decoding and visualizing the transmitted coded parts thereof.

7. Process according to claim 1, comprising associating to the coded text spacing signs defining the lateral spacing, dimensions and/or orientation of the character grid cells.

8. Process according to claim 1, wherein the reference grids are unidimensional.

9. Process according to claim 1, wherein the character grids represent authentication marks of a document bearing them and the decoded characters are visualized by checking the same against a comparison text and displaying at least one of at least two predetermined texts, depending on the results of said check.

* * * * *